(No Model.)
T. A. BRYAN.
COOKING VESSEL.
No. 533,156. Patented Jan. 29, 1895.
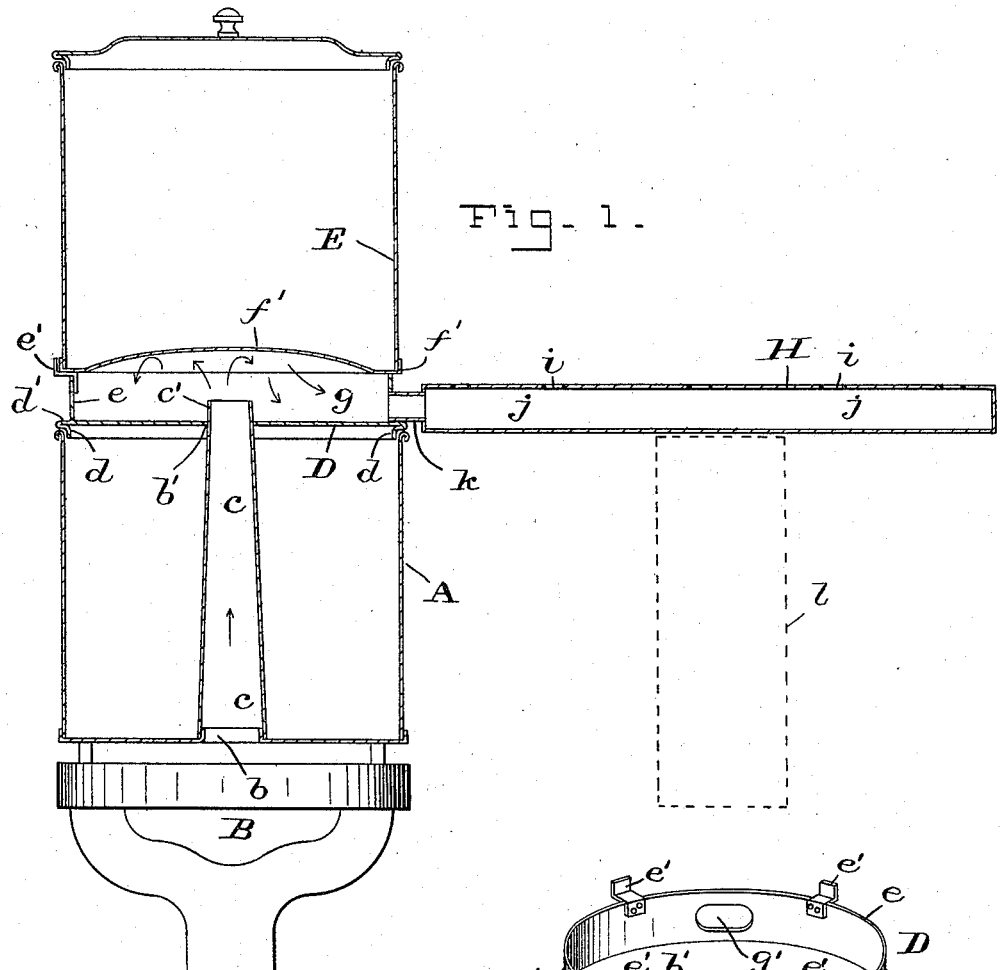
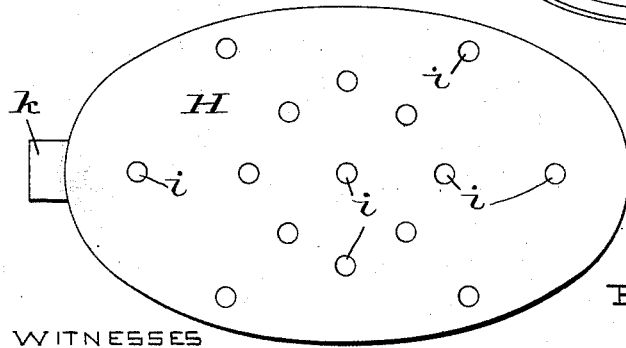
WITNESSES
L. I. Van Horn
Charles B. Mann Jr.
INVENTOR
Thomas A. Bryan
By Chas. B. Mann
ATTORNEY

UNITED STATES PATENT OFFICE.

THOMAS A. BRYAN, OF BALTIMORE, MARYLAND, ASSIGNOR TO THE BRYAN MANUFACTURING COMPANY, OF WEST VIRGINIA.

COOKING-VESSEL.

SPECIFICATION forming part of Letters Patent No. 533,156, dated January 29, 1895.

Application filed May 31, 1894. Serial No. 512,993. (No model.)

*To all whom it may concern:*

Be it known that I, THOMAS A. BRYAN, a citizen of the United States, residing at Baltimore, in the State of Maryland, have invented certain new and useful Improvements in Cooking-Vessels, of which the following is a specification.

This invention relates to certain new and useful improvements in cooking vessels of that class wherein a base or main vessel is provided with a heat-conducting tube or flue for the passage through it of the heated products of combustion from a heater or burner. By my invention the heat is employed for heating the contents of a second or auxiliary vessel arranged on top of the main vessel, and also to heat a warming shelf or pan to which this heat is also applied.

In the accompanying drawings illustrating my invention,—Figure 1 is a central vertical section of a cooking vessel showing my improvements. Fig. 2 is a perspective view of the top-lid or cover of the main cooking vessel. Fig. 3 is a plan view of the shelf.

In the drawings the letter, A, designates the main vessel which is shown in the present instance seated upon a suitable burner, B. This burner, however, constitutes no part of my present invention.

The vessel has a central hole, $b$, in its bottom and a tube or flue, $c$, has an open end and is fitted tight in coincidence with the said hole, $b$, and extends vertically up through the vessel, A. Through this tube the heat and products of combustion from the burner, B, pass up and are radiated or conducted laterally therefrom and thereby heat the contents of the main vessel, A. The top-lid or cover, D, of this vessel has the usual annular depending base flange, $d$, which takes against the interior walls of the vessel and secures the cover in place, and a rim-edge, $d'$, which seats upon the top edge of the main vessel. The cover also has a central hole, $b'$, up through which the top-end, $c'$, of the tube or flue projects. This cover is provided on top with a ring-shaped seat, $e$, on which a second or auxiliary vessel, E, is supported in position above the open end of the said tube or flue, $c$. The bottom rim, $f'$, of the auxiliary vessel seats upon the ring, $e$, and is held from lateral movement by vertical flanges, $e'$, on the ring. The auxiliary vessel, E, has a bottom, $f$, which takes above the top end of the flue, $c$, as shown. This bottom has the effect of deflecting the heat which rises from the flue and turning said heat down upon the top surface of the cover, D. The ring, $e$, prevents the bottom, $f$, of the upper auxiliary vessel, E, from setting too close down upon the cover and forms a heating space, $g$, between said bottom and the cover. This ring has a lateral opening, $g'$.

A hollow warming shelf, H, has small holes, $i$, in its top surface and a chamber, $j$, below said surface. It has a short pipe nose, $k$, in its side which makes connection with the lateral opening, $g'$, in the ring between the two vessels, A, E. This horizontal shelf may be supported at the side of said two vessels by any suitable means that will sustain it. The support is represented in the drawings by broken lines, $l$.

Now as the heat or products of combustion pass up into the tube, $c$, they heat the contents of the main vessel, A, by radiation laterally from the tube, and as they issue from the top-end, $c'$, they impinge against the bottom, $f$, of the upper vessel and heat the contents, and by said bottom are deflected or turned down upon the top-lid or cover, D, of the main vessel A, and further heat the contents thereof, after which they pass laterally through the opening, $g'$, into the chamber, $j$, of the horizontal shelf and heat it. By this means the contents of the main vessel, A, are heated by the deflected heat at the top, and the contents of the auxiliary vessel, E, are also heated, so that the same heat serves for two vessels. The heat then does a third duty by being directed into the hollow shelf, H, on which a plate or other dish may be placed.

Having thus described my invention, what I claim as new, and desire to secure by Letters Patent, is—

The combination of a base or main cooking vessel, A, having a top lid or cover, D, provided with a central hole, $b'$; a tube open at the bottom and top and extending vertically up through the said vessel and having the top end in coincidence with the hole in the cover; a ring-shaped seat on the top lid or cover; an auxiliary vessel, E, mounted on the said ring-shaped seat with a heat-circulating space between the bottom of said auxiliary vessel and the top lid or cover of the main vessel; and a hollow warming shelf, H, suitably supported at the side of said two vessels and connected by means of a pipe with said ring-shaped seat.

In testimony whereof I affix my signature in the presence of two witnesses.

THOMAS A. BRYAN.

Witnesses:
C. CALVERT HINES,
CHARLES B. MANN, Jr.